United States Patent [19]

Sugiyama

[11] Patent Number: 5,914,782
[45] Date of Patent: Jun. 22, 1999

[54] DIFFERENTIAL POLARIZATION INTERFERENCE MICROSCOPE FOR SURFACE FEATURE IMAGING

[75] Inventor: Yoshikazu Sugiyama, Yokohama, Japan

[73] Assignee: Nikon Corporation, Tokyo, Japan

[21] Appl. No.: 08/907,491

[22] Filed: Aug. 8, 1997

[30] Foreign Application Priority Data

Aug. 8, 1996 [JP] Japan ..................................... 8-227674
May 12, 1997 [JP] Japan ..................................... 9-137595

[51] Int. Cl.$^6$ ....................................................... G01B 9/02
[52] U.S. Cl. ............................................. 356/351; 356/357
[58] Field of Search .................................. 356/351, 357, 356/359; 359/371

[56] References Cited

U.S. PATENT DOCUMENTS

| | | | |
|---|---|---|---|
| 4,298,283 | 11/1981 | Makosch et al. | 356/351 |
| 5,420,717 | 5/1995 | Tabata | 359/371 |
| 5,604,591 | 2/1997 | Kitagawa | 356/351 |

*Primary Examiner*—Samuel A. Turner
*Attorney, Agent, or Firm*—Chapman and Cutler

[57] ABSTRACT

A differential interference microscope is capable of accurately measuring bumps on an object surface. A ray from a light source is guided to a polarizer and a birefringent prism in this order. An ordinary ray and an extraordinary ray, split by the birefringent prism, are then guided to an objective lens. The ordinary ray and the extraordinary ray, which have passed through the objective lens, telecentrically illuminate a sample. The ordinary ray and the extraordinary ray, after being reflected by the sample, are guided to the objective lens and the birefringent prism in this order. The composite ray composed by the birefringent prism is guided to an analyzer. A CCD is positioned at the image-forming position of the ray that has passed through the analyzer. Either the analyzer or the polarizer is rotatable about the optical axis of the differential interference microscope. A quantity of light that has passed through the analyzer or the polarizer is measured for every three or more rotation angles and for every picture element of the CCD. The measured quantity of light is Fourier-transformed with respect to the three or more rotation angles to determine the amplitude reflectance distributions and/or the surface contours of the sample.

20 Claims, 5 Drawing Sheets

DIFFERENTIAL POLARIZATION INTERFERENCE MICROSCOPE FOR SURFACE FEATURE IMAGING

BACKGROUND OF THE INVENTION

1. Field of the Invention

This invention relates to a differential interference microscope which may be used, for example, to observe microscopic bumps on a metal surface and/or phase objects within biological cells.

2. Description of Related Art

Conventionally, differential interference microscopes have been used to observe micro phase objects. An example of such conventional microscopes is shown in FIG. 8, which is a vertical illumination type differential interference microscope.

As shown in FIG. 8, a ray emitted from a light source 10 passes through a condenser lens 11 and a polarizer 12, which produces a linearly polarized ray 1. The linearly polarized ray 1 is reflected by a half-mirror 14 toward the object surface 17. The ray 1 forms a light-source image near the back focal point of the object lens 16. The ray 1 further passes through a Wollaston prism 15, which is positioned near the light-source image, and the objective lens 16, and illuminates the object surface 17 from above. In this case, the Wollaston prism 15 splits the ray 1 into an ordinary ray 2 and an extraordinary ray 3 having electric field oscillation planes which are perpendicular to each other. The ordinary ray 2 and the extraordinary ray 3 spread out with a certain angle therebetween. In FIG. 8, the oscillation plane of the electric field of the ordinary ray 2 is parallel to the paper plane, while the oscillation plane of the electric field of the extraordinary ray 3 is perpendicular to the paper plane.

If the polarization directions of the ordinary ray 2 and the extraordinary ray 3 are 45 degree-angles with respect to the optic axis of the polarizer 12, then the light quantities of the ordinary ray 2 and the extraordinary ray 3 become substantially equal. In addition, the Wollaston prism 15 is positioned in such a way that the center point 15a from which the ordinary ray 2 and extraordinary ray 3 diverge is in agreement with the back focal point of the objective lens 16. In this arrangement, the ordinary ray component 2 and the extraordinary ray component 3 of the light emitted from a point of the light source 10 pass through the objective lens 16 and telecentrically illuminate spots which are slightly apart from each other on the object surface 17.

The ordinary ray 2 and the extraordinary ray 3 that have illuminated the object surface 17 from above are reflected by the object surface 17. The reflected rays are depicted as an ordinary ray 4 and an extraordinary ray 5, respectively, in FIG. 8. The ordinary ray 4 and the extraordinary ray 5 pass through the objective lens 16 again, and they cross again at the center 15a at which the initial ray was split into the ordinary ray 2 and the extraordinary ray 3. That is, the center point 15a, to which the reflected ordinary ray 4 and the extraordinary ray 5 converge, and from which the ordinary ray 2 and the extraordinary ray 3 diverged, is self-conjugate with respect to the objective lens 16 and the object surface 17. The converged ordinary ray 4 and the extraordinary ray 4 pass through the Wollaston prism 15, and are composed into a composite ray 6. The ray 6 passes through the half-mirror 14 and the analyzer 18. In this process, only a linearly polarized component that is parallel to the optic axis of the analyzer 18 passes through the analyzer. This component further passes through a focusing lens 19 to form an image on an image plane 20. As has been described, the ordinary ray 2 and the extraordinary ray 3 strike the object surface 17 at positions slightly apart from each other, and the ordinary ray 4 and the extraordinary ray 5 reflected by these points form an image on the image plane 20. Accordingly, if there are bumps or unevenness on the object surface 17, interference fringes are formed on the image plane 20 because the optical path-lengths of the ordinary ray 4 and the extraordinary ray 5 between the object surface 17 to the image plane 17 become different, which causes a phase difference.

In this case, if the direction of the optic axis of the analyzer 18 is set parallel to that of the polarizer 12, then the image becomes brightest when the phase difference between the ordinary ray 4 and the extraordinary ray 5 is $2\pi n$ (n=0, 1, 2, ... ). If the optic axis of the analyzer 18 is made orthogonal to the optic axis of the polarizer 12, then the image becomes brightest when the phase difference between the ordinary ray 4 and the extraordinary ray 5 is $n+2\pi n$ (n=0, 1, 2, ... ). Hence, we can know the depth or the height of the bump located at an arbitrary point on the object plane 17 by observing a contrast pattern formed on the image plane 20.

In order to observe the bump on the object surface 17 in more detail, the wavelength of the ray is changed. The phase difference changes as the wavelength is varied, which results in a change in the contrast pattern. The bump on the object surface 17 can be detected with high accuracy by observing the change in the contrast pattern. Alternatively, the bump on the object surface 17 can be detected by using a white light and observing bright colors.

The conventional differential interference microscope mentioned above requires visual observation of interference patterns. This prevents one from achieving a degree of measurement accuracy beyond the magnitude of the wave length of the ray used for the observation. Such a degree of measurement accuracy is not satisfactory. Moreover, it is difficult for the conventional differential interference microscope to treat interference patterns quantitatively. Another problem in the conventional differential interference microscope is that the use of a light source having a broad range of wavelengths reduces the spatial resolution of the microscope due to the chromatic aberrations of the lenses. In addition, any reflectance variations on the object surface diminishes the SN ratio of the image, which makes observation of the interference patterns difficult.

SUMMARY OF THE INVENTION

Under these circumstances, the invention aims to provide a differential interference microscope which is capable of highly accurate measurement of bump-contours of an object, even if a monochromatic light is used, and even if there are changes in the reflectance on the object surface, without being affected by such changes. The invention also aims to provide a differential interference microscope which can measure the reflectance distribution on the object surface. It is another objective of the invention to provide a differential interference microscope which can simultaneously measure the transmittance distribution, the thickness distribution and/or the refractive index distribution on a sample. The invention further provides a differential interference microscope which has the performance for correcting a displacement of the angle origin of an analyzer.

To achieve the objectives mentioned above, the vertical illumination type differential interference microscope according to the present invention guides a ray emitted from a light source to a polarizer and a birefringent prism, in this order. The ray is split into an ordinary ray and an extraordinary ray by the birefringent prism. The ordinary ray and the extraordinary ray split by the birefringent prism is guided to and passes through the objective lens. The ordinary ray and the extraordinary ray that have passed through the objective lens illuminate a sample telecentrically. The ordinary ray and the extraordinary ray which have been reflected by the sample are guided to the objective lens and the birefringent prism in this order. The birefringent prism composes the ordinary ray and the extraordinary ray into a composite ray, which is then guided to an analyzer. A charge-coupled device (CCD) is positioned at an image-forming position of the ray that has passed through the analyzer. Either the analyzer or the polarizer is made rotatable around the optical axis of the vertical illumination type differential interference microscope. A quantity of light which has passed through either the analyzer or the polarizer is measured for every three or more rotation angles and for every picture element of the CCD. The measured quantity of light is Fourier-transformed with respect to the three or more rotation angles, thereby determining the amplitude reflectance distributions and/or the surface contours of the sample.

In another aspect of the invention, a vertical illumination type differential interference microscope is provided. This microscope guides a ray emitted from a light source to a polarizer and a first birefringent prism in this order. The ray is split into an ordinary ray and an extraordinary ray by the first birefringent prism. The ordinary ray and the extraordinary ray split by the first birefringent prism is guided to and passes through an illumination lens, and illuminates a sample telecentrically. The ordinary ray and the extraordinary ray that have passed through the sample are guided to the objective lens and the second birefringent prism in this order, and are composed into a composite ray by the second birefringent prism. The composite ray is then guided to an analyzer. A CCD is positioned at an image-forming position of the composite ray that has passed through the analyzer. Either the analyzer or the polarizer is made rotatable around the optical axis of the transmitted-illumination type differential interference microscope. A quantity of the light that passed through either the analyzer or the polarizer is measured for every three or more rotation angles and for every picture element of the CCD. The measured quantity of light is Fourier-transformed with respect to the three or more rotation angles, thereby determining the amplitude reflectance distributions and/or the thickness distributions and/or the refractive index distributions of the sample.

DESCRIPTION OF PREFERRED EMBODIMENTS

Figure 1:
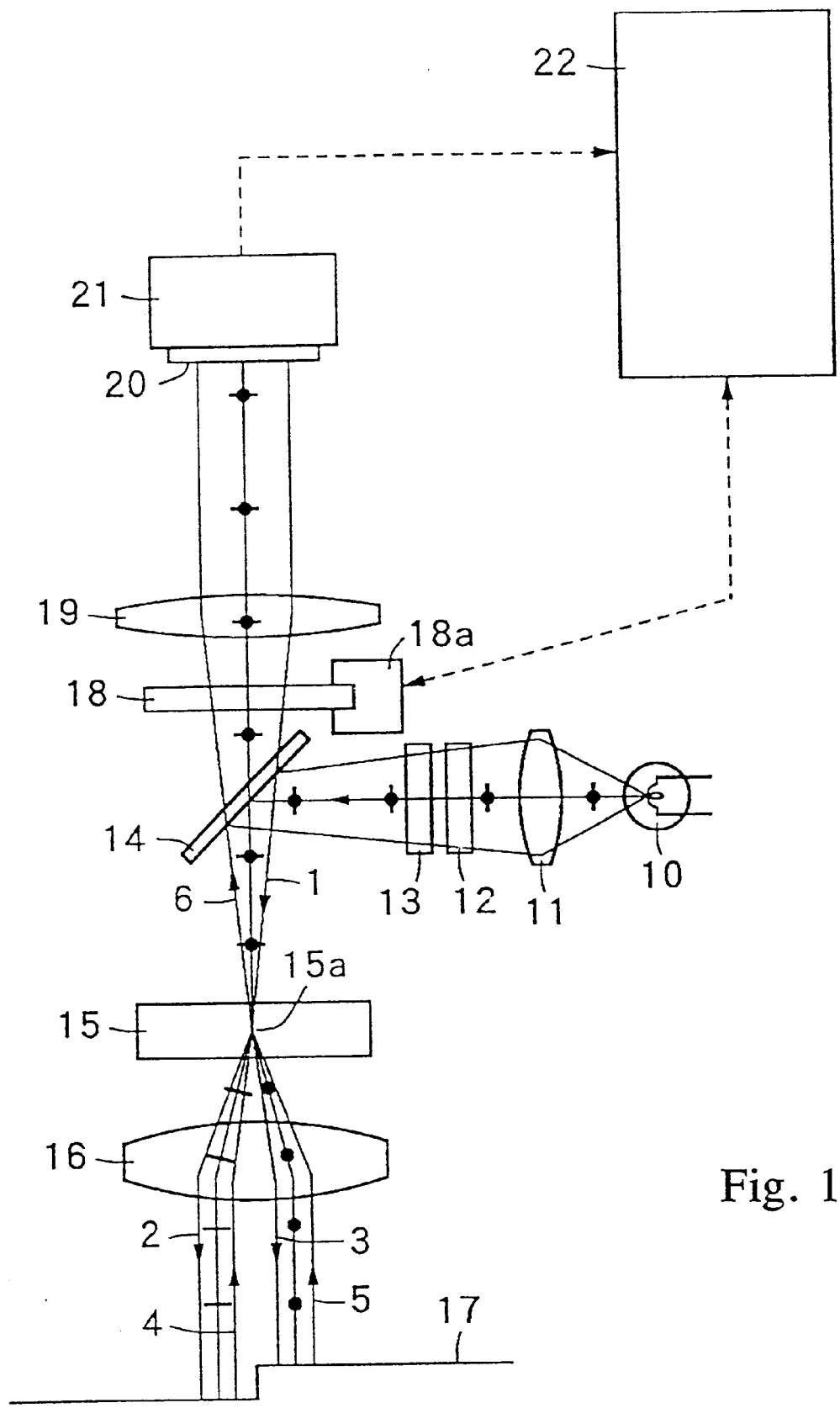
FIG. 1 illustrates the structure of a vertical illumination type differential interference microscope according to the first embodiment of the invention.
Figure 2:
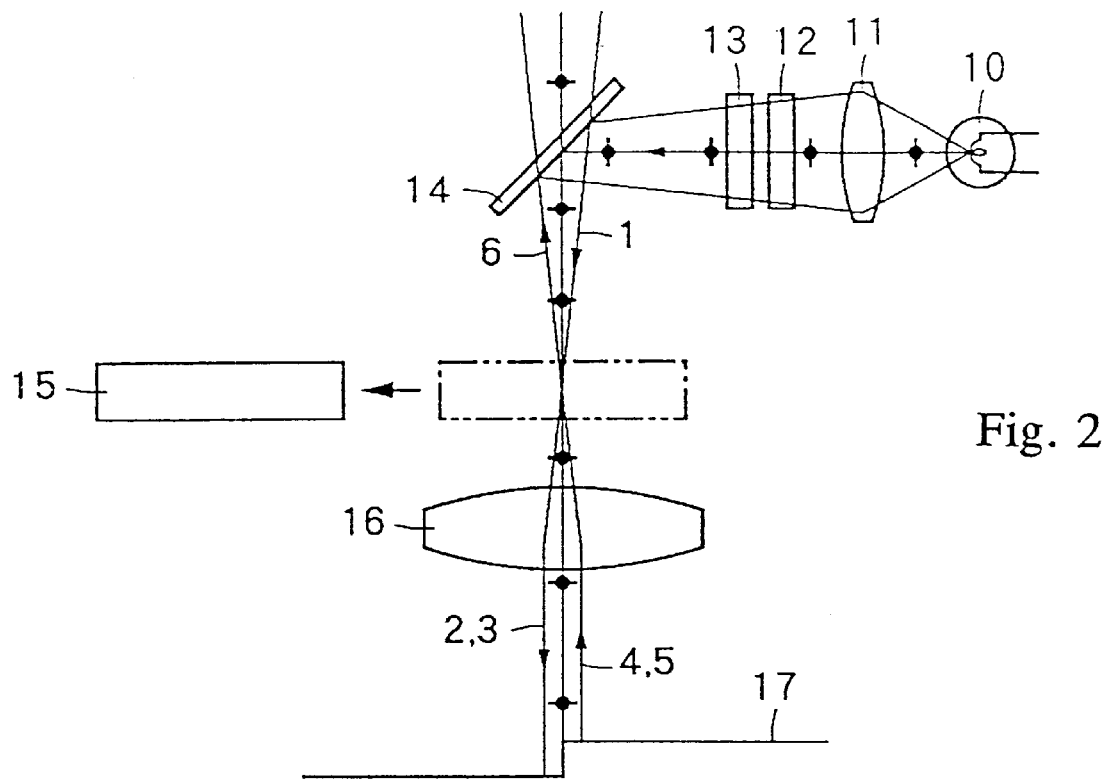
FIG. 2 illustrates major parts of the differential interference microscope and shows the reference mode according to the first embodiment.

FIG. 1 shows the first embodiment of the invention. Here, the invention is applied to a vertical illumination type differential interference microscope. A ray emitted from a light source 10 is made convergent by a condenser lens 11. The convergent ray passes through a polarizer 12 and a phase plate 13, which produces an elliptically polarized ray 1. The ray 1 is then reflected by a half-mirror 14, and strikes a Wollaston prism 15. The birefringent effect of the Wollaston prism 15 splits the ray 1 into an ordinary ray 2 and an extraordinary ray 3 having electric field oscillation planes which are orthogonal to each other. The ordinary ray 2 and the extraordinary ray 3 propagate into mutually different directions. In FIG. 1, the electric field of the ordinary ray 2 is parallel to the paper, while the electric field of the extraordinary ray 3 is perpendicular to the paper.

The ordinary ray 2 and the extraordinary ray 3 spread (diverge) with a certain angle between them. An objective lens 16 is positioned so that its back focal point lies at the center point 15a of the divergence. By this arrangement, the wavefronts of the ordinary ray 2 and the extraordinary ray 3 which have passed through this objective lens 16 become parallel to each other. Thus, the ordinary ray 2 and the extraordinary ray 3 telecentrically illuminate two points which are slightly apart from each other on an object surface 17. The ordinary ray 2 and the extraordinary ray 3 are reflected and diffracted by the object surface 17. The reflected rays are indicated as an ordinary ray 4 and an extraordinary ray 5, respectively, in FIG. 1. The reflected ordinary ray 4 and the extraordinary ray 5 strike the objective lens 16 again, and cross at the back focal point of the objective lens 16. When they pass through the Wollaston prism 15, their wavefronts superpose each other and become a ray 6. The ray 6 strikes a rotary analyzer 18, which allows only a light component parallel to the optic axis of the analyzer 18 to pass through. The transmitted component passes through a focusing lens 19 and forms an image on a CCD 21 located on an image plane 20.

Because the ordinary ray component 4 and the extraordinary ray component 5 of the ray 6 were reflected at different points on the object surface 17, their optical path lengths become different depending on the bump distribution on the object surface 17. As a result, interference patterns are formed on the image plane 20. In this situation, if the controller 18a rotates the analyzer 18 about the optical axis, the contrast of this interference fringe changes. The change in the contrast is scanned for every pixel of the CCD 21 at a rate synchronized with the rotation of the analyzer 18 which is controlled by a computer 22. The scanned data is Fourier-transformed for image processing so that a bump or unevenness on the object surface 17 is detected. Although the analyzer 18 is rotated in this embodiment, the same result can be obtained by rotating the polarizer 12 instead of the analyzer 18.

Next, the principle of the measurement operation in this embodiment will be explained. The polarization state of the ray 1 that has propagated past the polarizer 12 and the phase plate 13 in FIG. 1 can be expressed by equation (1) in terms of Jones vectors. The o-axis represents the polarization direction of the ordinary rays 2 and 4 through the Wollaston prism 15 and the e-axis represents the polarization direction of the extraordinary rays 3 and 5.

$$\begin{pmatrix} E_{1o} \\ E_{1e} \end{pmatrix} = E_{1e} \cdot \begin{pmatrix} \varepsilon \cdot e^{i\delta} \\ 1 \end{pmatrix} \quad (1)$$

where $E_{1o}$ and $E_{1e}$ represent the o-axis component and the e-axis component of the electric field vector of the ray 1, respectively, $\varepsilon$ represents the absolute value of the ratio between the o-axis component and the e-axis component, and $\delta$ represents the phase difference between the o-axis component and the e-axis component.

The ray 1 is then split into an ordinary ray component 2 and an extraordinary ray component 3 by the Wollaston prism 15. The ray 2 and the ray 3 pass through the objective lens 16 and strike the object surface 17. Assuming that the incident position of the ordinary ray 2 is (x,y) and that the amount of shear created by the Wollaston prism is ▲x, the incident position of the extraordinary ray is expressed by (x+▲x, y). If we denote the amplitude reflectance at the two points on the object surface 17 by r(x) and r(x+▲x), then the polarization state ($E_{4o}$, $E_{4e}$) of the ordinary ray component 4 of the ray reflected from the object surface 17, and the polarization state ($E_{5o}$, $E_{5e}$) of the extraordinary ray component 5 of the ray reflected from the object surface 17, can be represented in terms of Jones vectors as follows:

$$\begin{pmatrix} E_{4o} \\ E_{4e} \end{pmatrix} = r(x, y) \cdot \begin{pmatrix} 1 & 0 \\ 0 & 0 \end{pmatrix} \begin{pmatrix} E_{1o} \\ E_{1e} \end{pmatrix} = r(x) \cdot E_{1e} \cdot \begin{pmatrix} \varepsilon \cdot e^{i\delta} \\ 0 \end{pmatrix} \quad (2)$$

$$\begin{pmatrix} E_{5o} \\ E_{5e} \end{pmatrix} = r(x+\Delta x, y) \cdot \begin{pmatrix} 0 & 0 \\ 0 & 1 \end{pmatrix} \begin{pmatrix} E_{1o} \\ E_{1e} \end{pmatrix} = r(x+\Delta x) \cdot E_{1e} \cdot \begin{pmatrix} 0 \\ 1 \end{pmatrix}$$

Here, the amplitude reflectance is independent of the polarization states.

The ordinary ray 4 and the extraordinary ray 5 then pass through the objective lens 16 and the Wollaston prism 15. The wave front of the ordinary ray 4 and the wave front of the extraordinary ray 5 superpose each other and become a ray 6. The resultant polarization state ($E_{6o}$, $E_{6e}$) of the ray 6 can is expressed as follows:

$$\begin{pmatrix} E_{6o} \\ E_{6e} \end{pmatrix} = \begin{pmatrix} E_{4o} \\ E_{4e} \end{pmatrix} + \begin{pmatrix} E_{5o} \\ E_{5e} \end{pmatrix} = r_e \cdot E_{1e} \cdot \begin{pmatrix} \rho \cdot e^{i\Delta} & 0 \\ 0 & 1 \end{pmatrix} \begin{pmatrix} \varepsilon \cdot e^{i\delta} \\ 1 \end{pmatrix} \quad (3)$$

$$= r_e \cdot E_{1e} \cdot \begin{pmatrix} \rho \cdot \varepsilon \cdot e^{i(\delta+\Delta)} \\ 1 \end{pmatrix}$$

where $r_e = r(x+\Delta x)$

Here, $r_e = r(x+\blacktriangle x)$, $\rho$ denotes the absolute value of the ratio between the amplitude reflectance at the incident position (x, y) of the ordinary ray 2 and the amplitude reflectance at the incident position (X+▲x, y) of the extraordinary ray 3, and ▲ denotes the phase difference between the reflected ordinary ray 4 and the reflected extraordinary ray 5. Since $\rho e^{i\blacktriangle} = r(x)/r(x+\blacktriangle x)$, $\rho$ can be expressed as:

$\rho = |r(x)/r(x+\blacktriangle x)|$

The light quantity of the polarized ray 6 when it enters the CCD 21 after passing through the rotating analyzer 18 is expressed as follows $$I_{out}(\theta) = |E_{6o}\cos(\theta) + E_{6e}\sin(\theta)|^2 \quad (4)$$
$$= b_0 + b_1\cos(2\theta) + b_2\sin(2\theta)$$

where $b_0 = (1\ 2)|E_{1e}|^2 \cdot |r_e|^2 \cdot (\rho^2 \varepsilon^2 + 1)$ $b_1 = (1\ 2)|E_{1e}|^2 \cdot |r_e|^2 \cdot (\rho^2 \varepsilon^2 - 1))$ $b_2 = |E_{1e}|^2 \cdot |r_e|^2 \cdot \rho\varepsilon\cos(\delta+\Delta)$ Here, $\theta$ represents the rotation angle of the polarization axis. The origin of the rotation angle is defined such that the polarization angle of the rotating analyzer 18 coincides with the polarization direction of the ordinary rays 2 and 4 produced by the Wollaston prism 15 when $\theta=0$, i.e., a direction parallel to the paper surface. In this way, $I_{out}(\theta)$ of Equation (4) is a periodic function with respect to $\theta$, and $b_0$, $b_1$, $b_2$ can be obtained by Fourier-transforming $I_{out}(\theta)$ with respect to $\theta$. It should be noted that three or more values of the light quantity $I_{out}(\theta)$ must be sampled because three quantities $b_0$, $b_1$, and $b_2$ are computed in this case.

Once $b_0$, $b_1$, and $b_2$ are computed, $\rho$ and ▲ can be obtained as follows $$\rho \cdot \varepsilon = \sqrt{\frac{b_0 + b_1}{b_0 - b_1}} \quad (5)$$

$$\cos(\Delta + \delta) = \frac{b_2}{\sqrt{b_0^2 - b_1^2}}$$

$\rho$ cannot be obtained without knowing the values of $\varepsilon$ and $\varepsilon$ and $\delta\varepsilon$ and $\delta$ can be computed based on the positional arrangement shown in FIG. 1. In order to obtain more accurate values of $\varepsilon$ and $\delta$ taking into account the polarization characteristics of the optical system, the light quantity $I_{out}(\theta)$ will be measured in the reference mode in which the Wollaston prism 15 is removed from the optical path. In this case, since the polarization state of the ray 6 coincides with that of the ray 1, the polarization state of the ray 6 can be expressed as follows:

$$\begin{pmatrix} E_{6o} \\ E_{6e} \end{pmatrix} = E_{1e} \cdot \begin{pmatrix} \varepsilon \cdot e^{i\delta} \\ 1 \end{pmatrix} \quad (6)$$

As in the sample measurement in the measuring mode using the Wollaston prism 15, the change in the light quantity of the ray which strikes the CCD 21 is measured while rotating the analyzer 18. The change in the light quantity $I_{in}(\theta)$ can be expressed as follows:

$$I_{in}(\theta) = |E_{6o} \cdot \cos(\theta) + E_{6e} \cdot \sin(\theta)|^2 \quad (7)$$
$$= a_0 + a_1 \cdot \cos(2\theta) + a_2\sin(2\theta)$$

where $$a_0 = \frac{1}{2}|E_{1e}|^2 \cdot (\varepsilon^2 + 1)$$

$$a_1 = \frac{1}{2}|E_{1e}|^2 \cdot (\varepsilon^2 - 1)$$

-continued $$a_2 = |E_{1e}|^2 \cdot \varepsilon \cdot \cos(\delta)$$

The above yield $$\varepsilon = \sqrt{\frac{a_0 + a_1}{a_0 - a_1}} \tag{8}$$

$$\cos(\delta) = \frac{a_2}{\sqrt{a_0^2 - a_1^2}}$$

Thus, we can obtain $\varepsilon$ and $\delta$. Consequently, Equation (5) yields $\rho$ and ▲.

On the other hand, $\rho$ is given by equation (9). By denoting the depth of the bump at the incident point (x,y) of the ordinary ray on the object surface 17 as d(x,y), ▲ can be given by equation (10).

$$\rho = |r(x,y)/r(x+\Delta x,y)| \tag{9}$$

$$\Delta = d(x,y) - d(x+\Delta x,y) \tag{10}$$

Here, (x+▲x, y) is the incident position of the extraordinary ray.

As is clear from Equation (10), ▲ represents a bump differential between the incident position (x, y) of the ordinary ray and the incident position (x+▲x, y) of the extraordinary ray on the object surface. $\rho$ can be further transformed $$\log(\rho) = \log(|r(x,y)|) - \log(|r(x+\Delta x,y)|) \tag{11}$$

which represents a logarithmic amplitude reflectance differential on the object surface 17.

Hence, we can find bumps and reflectance distributions on the object surface by observing ▲ and $\rho$ throughout the object surface and integrating ▲ and log($\rho$) with respect to x, respectively. In this way, according to this embodiment, we can measure reflectance distributions on an object surface even when the object surface has bumps, and we can measure bumps on the object surface even when the object surface has reflectance distributions.

As is clear from Equation (5), the information we can obtain about ▲ is the value of cos(▲+$\delta$). Hence, two solutions for ▲ obtainable from cos(▲+$\delta$) are $$\Delta = \begin{cases} |\Delta + \delta| - \delta \\ -|\Delta + \delta| - \delta \end{cases} \tag{12}$$

Thus, the value of $\rho$ can be determined by the first measurement. However, the value of ▲ cannot be determined by the first measurement. In order to solve this problem, it suffices to conduct a second measurement of $\delta$ by changing the value of $\delta$. More precisely, let $\delta_1$ be the value of $\delta$ from the first measurement, and $\delta_2$ be the value of $\delta$ from the twice measurement. The values of cos(▲+$\delta_1$) and cos(▲+$\delta_2$) can be determined by the twice measurement. The values of cos(▲) and sin(▲) can be determined from these values when combined with the values of $\delta_1$ and $\delta_2$ as follows.

$$\begin{pmatrix} \cos(\Delta) \\ \sin(\Delta) \end{pmatrix} = \tag{13}$$

$$\frac{1}{-\cos\delta_1 \cdot \sin\delta_2 + \cos\delta_2 \cdot \sin\delta_1} \times \begin{pmatrix} -\sin\delta_2 & \sin\delta_1 \\ -\cos\delta_2 & \cos\delta_1 \end{pmatrix} \cdot \begin{pmatrix} \cos(\Delta + \delta_1) \\ \cos(\Delta + \delta_2) \end{pmatrix}$$

In this way, one can uniquely determine ▲ once the values of cos(▲) and sin(▲) are obtained. However, Equation (13) has no solutions when $$-\cos(\delta_2) \cdot \sin(\delta_2) + \cos(\delta_2) \cdot \sin(\delta_1) = 0 \tag{14}$$

Hence, $\delta_1$ and $\delta_2$ must be so chosen that they do not satisfy Equation (14).

Figure 3:
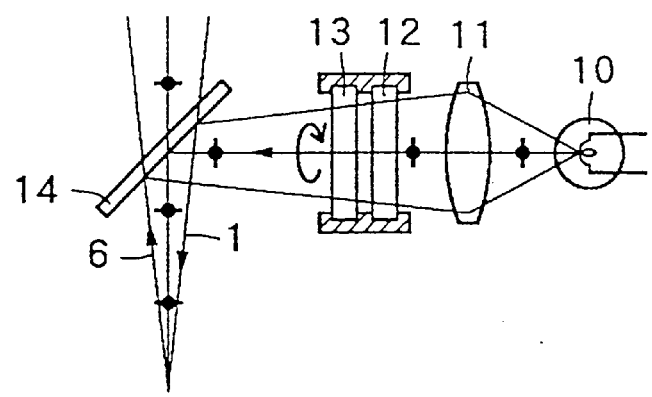
FIG. 3 illustrates major parts of the differential interference microscope and shows an example of the structure for measuring bump distributions according to the first embodiment.
Figure 4:
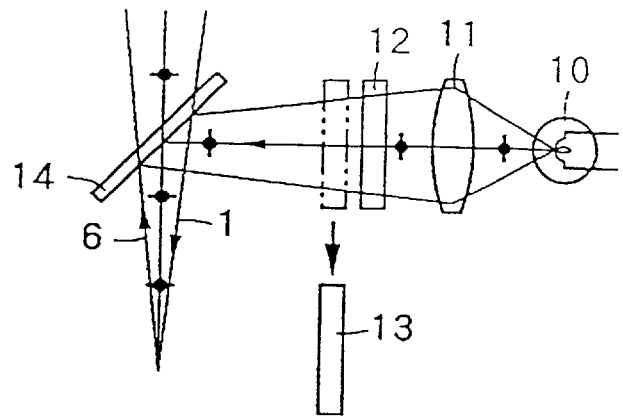
FIG. 4 illustrates another example of the structure for measuring bump distributions according to the first embodiment.

There are several methods for altering the value of $\delta$ between the first and second measurements. The first method is shown in FIG. 3, in which the polarizer 12 and the phase plate 13 are rotated together as one unit around the optical axis. By switching the positions of the polarizer 12 and the phase plate 13 together into two or more different rotational positions, the polarization state of the ray 1 which strikes the Wollaston prism 15 can be altered. In the second method, the phase plate 13 is removed from the optical path as shown in FIG. 4. By switching between the two states in which the phase plate 13 is inserted on and removed from the optical path, the polarization state of the ray 1 which strikes the Wollaston prism 15 can be changed.

Figure 5:
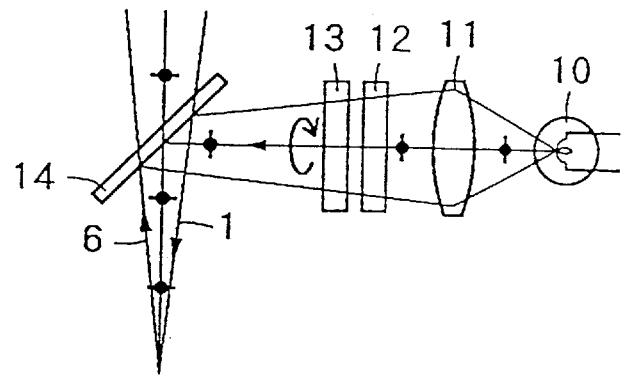
FIG. 5 illustrates still another example of the structure for measuring bump distributions according to the first embodiment.
Figure 6:
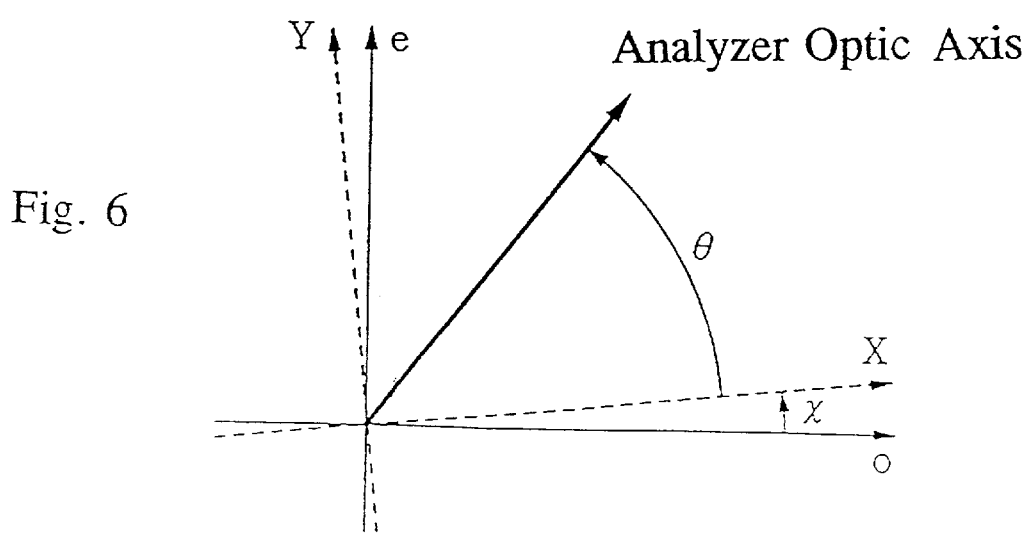
FIG. 6 illustrates the relation between the coordinates for the Wollaston prism and the coordinates for the analyzer according to the first embodiment.

In the third method, the phase plate 13 is rotated about the optical axis as shown in FIG. 5. By switching the phase plate 13 into two or more different positions, the polarization state of the ray 1 which strikes the Wollaston prism 15 can be altered.

Note that we need to switch the polarization state of the ray 1 into two or more states in order to obtain the value of ▲ as explained in the above. However, it suffices to conduct the measurement only once in order to find the values of $\rho$ and |▲|. There is no need to switch the polarization state of the ray 1. Hence, there is no need to install the phase plate 13 between the polarizer 12 and the half-mirror 14 either.

Next, in order to obtain the absolute value $\rho$ of the amplitude reflectance ratio between the incident positions of the ordinary ray 2 and the extraordinary ray 3 on the object surface 1, and the phase difference ▲ between the reflected ordinary ray 4 and the reflected extraordinary ray 5, the relation between the direction of the polarization axis of the rotating analyzer 18 and the direction of the polarization axis of the Wollaston prism 15 must be known. More precisely, the rotation angle θ of the polarization axis of the rotating analyzer 18 has been measured by setting the direction of the polarization axis of the ordinary ray produced by the Wollaston prism 15 as the direction of the origin (θ=0) in the first embodiment of the invention. In practice, however, it often happens that the direction of the polarization axis of the ordinary ray or the extraordinary ray produced by the Wollaston prism 15 cannot be precisely measured. Hence, on many occasions, it is impossible to precisely measure in what directions the polarization axes of the analyzer 18, the polarizer 12, and the phase plate 13 are positioned with respect to the coordinates of the Wollaston prism 15.

It is presumed that the frame of reference on the rotating analyzer 18 is the X-Y frame of reference, the frame of reference of the Wollaston prism 15 is the o-e frame of reference and the direction of the X-Y frame of reference as viewed from the o-e frame of reference is χ. If the rotation angle of the rotating analyzer 18 measured in the X-Y frame of reference is θ, then the rotation angle of the rotating analyzer 18 measured in the o-e frame of reference becomes θ+χ.

For this reason, the displacement angle $\chi$ of the angle origin is added to the signal $I_{out}(\theta)$ which is obtained by rotating the analyzer in the measurement mode shown in Equations (4) and (7), and to the signal $I_{out}(\theta)$ in the reference mode. The signal is represented as follows.

$$I_{out}(\theta) = |E_{6o} \cdot \cos(\theta + \chi) + E_{6e} \cdot \sin(\theta + \chi)|^2 \quad (15)$$
$$= b_0 + b_1 \cdot \cos(2(\theta + \chi)) + b_2 \sin(2(\theta + \chi))$$

where $$b_0 = \frac{1}{2}|E_{1e}|^2 \cdot |r_e|^2 \cdot (\rho^2 \varepsilon^2 + 1) \quad (16)$$

$$b_1 = \frac{1}{2}|E_{1e}|^2 \cdot |r_e|^2 \cdot (\rho^2 \varepsilon^2 - 1)$$

$$b_2 = |E_{1e}|^2 \cdot |r_e|^2 \cdot \rho \cdot \varepsilon \cdot \cos(\delta + \Delta)$$

$$I_{in}(\theta) = \frac{1}{2}|E_{6o} \cdot \cos(\theta + \chi) + E_{6e} \cdot \sin(\theta + \chi)|^2$$
$$= a_0 + a_1 \cdot \cos(2(\theta + \chi)) + a_2 \sin(2(\theta + \chi))$$

where $$a_0 = \frac{1}{2}|E_{1e}|^2 \cdot (\varepsilon^2 + 1)$$

$$a_1 = \frac{1}{2}|E_{1e}|^2 \cdot (\varepsilon^2 - 1)$$

$$a_2 = |E_{1e}|^2 \cdot \varepsilon \cdot \cos(\delta)$$

In Equation (15), due to the angle displacement $\chi$ between the X-Y frame of reference, which is a measurement system, and the o-e frame of reference, Fourier coefficients $b_0$ through $b_2$ with respect to the o-e frame of reference cannot be obtained. Hence, $\rho$ and $\blacktriangle$ cannot be obtained. For the same reason, in the expression of Equation (16), $a_0$ through $a_2$ cannot be computed and hence $\delta$ and $\varepsilon$ cannot be obtained either.

Hereinafter, a subscript o will be attached to the coefficients of the Fourier transform based on the o-e frame of reference, and a subscript x will be attached to the coefficients of the Fourier transform based on the X-Y frame of reference. The light quantity $I_{out}(\theta)$ that enters the CCD in the measurement mode and the light quantity $I_{in}(\theta)$ in the reference mode can be expressed as follows.

$$I_{out}(\theta) = b_{x0} + b_{x1} \cdot \cos(2\theta) + b_{x2} \cdot \sin(2\theta) \quad (17\text{-}1)$$
$$= b_{o0} + b_{o1} \cdot \cos(2(\theta + \chi)) + b_{o2} \sin(2(\theta + \chi))$$

$$I_{in}(\theta) = a_{x0} + a_{x1} \cdot \cos(2\theta) + a_{x2} \cdot \sin(2\theta) \quad (17\text{-}2)$$
$$= a_{o0} + a_{o1} \cdot \cos(2(\theta + \chi)) + a_{o2} \sin(2(\theta + \chi))$$

where the $b_{xi}$, $a_{xi}$ (i=0, 1, 2) are the Fourier transform coefficients of the light quantity changes observed in the X-Y frame of reference which is a measurement system. Hence, these values can actually be obtained by Fourier-transforming the light quantities measured in the CCD.

First, as we can see from Equations (17-1) and (17-2), the following relations hold between the $b_{xi}$ and the $b_{oi}$ (i=0, 1, 2), which represent the polarization state of the ray 6 in the measurement mode, and between the $a_{xi}$ and the $a_{oi}$ (i=0, 1, 2), which represent the polarization state of the ray 1 in the reference mode.

$$\begin{pmatrix} b_{x0} \\ b_{x1} \\ b_{x2} \end{pmatrix} = \begin{pmatrix} 1 & 0 & 0 \\ 0 & \cos(2\chi) & -\sin(2\chi) \\ 0 & \sin(2\chi) & \cos(2\chi) \end{pmatrix} \cdot \begin{pmatrix} b_{o0} \\ b_{o1} \\ b_{o2} \end{pmatrix} \quad (18\text{-}1)$$

$$\begin{pmatrix} a_{x0} \\ a_{x1} \\ a_{x2} \end{pmatrix} = \begin{pmatrix} 1 & 0 & 0 \\ 0 & \cos(2\chi) & -\sin(2\chi) \\ 0 & \sin(2\chi) & \cos(2\chi) \end{pmatrix} \cdot \begin{pmatrix} a_{o0} \\ a_{o1} \\ a_{o2} \end{pmatrix} \quad (18\text{-}2)$$

The relation between the ray 1 and the ray 6 in the o-e frame of reference will now be considered. $a_{o3}$ and $b_{o3}$ are newly defined as follows. The sign convention for $a_{o3}$ and $b_{o3}$ will be chosen so that the sign of the phase difference in the polarization state of the ray 1 and that of the ray 6 correspond to the sign of $a_{o3}$ and that of $b_{o3}$, respectively.

$$a_{o3} = \pm(a_{o0} + a_{o1} + a_{o2})^{1/2}$$
$$b_{o3} = \pm(b_{o0} + b_{o1} + b_{o2})^{1/2} \quad (19)$$

From Equations (16), (17) and (19), the relation between the $a_{oi}$ (i=0, 1, 2) and the $b_{oi}$ (i=0, 1, 2) can be expressed as follows.

$$\begin{pmatrix} b_{o0} \\ b_{o1} \\ b_{o2} \\ b_{o3} \end{pmatrix} = |E_{1e}|^2 \cdot |r_e|^2 \cdot \begin{pmatrix} \frac{1}{2} \cdot (\rho^2 + 1) & \frac{1}{2} \cdot (\rho^2 - 1) & 0 & 0 \\ \frac{1}{2} \cdot (\rho^2 - 1) & \frac{1}{2} \cdot (\rho^2 + 1) & 0 & 0 \\ 0 & 0 & \rho \cdot \cos(\Delta) & -\rho \cdot \sin(\Delta) \\ 0 & 0 & \rho \cdot \sin(\Delta) & \rho \cdot \cos(\Delta) \end{pmatrix} \begin{pmatrix} a_{o0} \\ a_{o1} \\ a_{o2} \\ a_{o3} \end{pmatrix} \quad (20)$$

Hence, Equations (18), (19), and (20) yield the following relation between the coefficients $b_{xi}$ (i=0, 1, 2), which represent the polarization state of the ray 6 with respect to the X-Y coordinate system, and the coefficients $a_{xi}$ (i=0, 1, 2), which represent the polarization state of the ray 1.

$$\begin{pmatrix} b_{x0} \\ b_{x1} \\ b_{x2} \\ b_{x3} \end{pmatrix} = |E_{1e}|^2 \cdot |r_e|^2 \cdot [R(\chi)] \cdot [S] \cdot [R(\chi)] \cdot \begin{pmatrix} a_{x0} \\ a_{x1} \\ a_{x2} \\ a_{x3} \end{pmatrix} \quad (21)$$

Here the matrices [S], and [R($\chi$)] are represented as follows.

$$[S] = \begin{pmatrix} \frac{1}{2} \cdot (\rho^2 + 1) & \frac{1}{2} \cdot (\rho^2 - 1) & 0 & 0 \\ \frac{1}{2} \cdot (\rho^2 - 1) & \frac{1}{2} \cdot (\rho^2 + 1) & 0 & 0 \\ 0 & 0 & \rho \cdot \cos(\Delta) & -\rho \cdot \sin(\Delta) \\ 0 & 0 & \rho \cdot \sin(\Delta) & \rho \cdot \cos(\Delta) \end{pmatrix}$$

$$[R(\chi)] = \begin{pmatrix} 1 & 0 & 0 & 0 \\ 0 & \cos(2\chi) & -\sin(2\chi) & 0 \\ 0 & \sin(2\chi) & \cos(2\chi) & 0 \\ 0 & 0 & 0 & 1 \end{pmatrix}$$

Furthermore, $[R(\chi)][S][R(-\chi)]$ is computed as follows:

$$[R(\chi)] \cdot [S][R(-\chi)] = \begin{pmatrix} t_1 & t_2 & t_3 & 0 \\ t_2 & \frac{1}{2}(t_1+t_6)+t_7 & t_8 & t_5 \\ t_3 & t_8 & \frac{1}{2}(t_1+t_6)-t_7 & -t_4 \\ 0 & -t_5 & t_4 & t_6 \end{pmatrix} \quad (22)$$

where $$t_1 = \frac{1}{2}(\rho^2+1)$$

$$t_2 = \frac{1}{2}(\rho^2-1) \cdot \cos(2\chi)$$

$$t_3 = \frac{1}{2}(\rho^2-1) \cdot \sin(2\chi)$$

$$t_4 = \rho \cdot \sin(\Delta) \cdot \cos(2\chi)$$

$$t_5 = \rho \cdot \sin(\Delta) \cdot \sin(2\chi)$$

$$t_6 = \rho \cdot \cos(\Delta)$$

$$t_7 = \frac{1}{2}(t_1-t_6) \cdot \cos(4\chi)$$

$$t_8 = \frac{1}{2}(t_1-t_6) \cdot \sin(4\chi)$$

In this embodiment, the ray 1 shown in FIG. 1 must be measured in two different polarization states in order to determine the sign of the value ▲. The value of $\chi$ can be computed by using data from these two measurements, the relation defined by Equation (21), and Equation (22). By using the two sets of values $a_{xi}$(i=0, 1, 2, 3) and $b_{xi}$(i=0, 1, 2, 3) obtained at this stage, and by finding the ratio for each $t_i$(i=1 through 8), one can obtain tan($2\chi$) from Equation (22). This procedure will be explained below in more detail.

Out of the two sets of values $a_{xi}$(i=0, 1, 2, 3) and $b_{xi}$(i=0, 1, 2, 3) obtained by measuring the ray 1 in two distinct polarization states, the polarization state of the ray 1 in the first measurement is denoted as $a_{x1i}$(i=0, 1, 2, 3), the polarization state of the ray 6 shown in FIG. 1 is denoted as $b_{x1i}$(i=0, 1, 2, 3), the polarization state of the ray 1 in the second measurement is denoted as $a_{x2i}$(i=0, 1, 2, 3), and the polarization state of the ray 6 is denoted as $b_{x2i}$(i=0, 1, 2, 3). The relations among the $a_{x1i}$, $b_{x1i}$(i=0, 1, 2, 3), $a_{x2i}$, $b_{x2i}$(i=0, 1, 2, 3) and the $t_1$ (i=1 through 8) can be summarized as follows according to Equations (21) and (22).

$$\begin{pmatrix} e_1 \cdot b_{x10} \\ e_1 \cdot b_{x11} \\ e_1 \cdot b_{x12} \\ e_1 \cdot b_{x13} \\ e_2 \cdot b_{x20} \\ e_2 \cdot b_{x21} \\ e_2 \cdot b_{x22} \\ e_2 \cdot b_{x23} \end{pmatrix} = \begin{pmatrix} t_1 & t_2 & t_3 & 0 & & & & \\ t_2 & t_a & t_8 & t_5 & & 0 & & \\ t_3 & t_8 & t_b & -t_4 & & & & \\ 0 & -t_5 & t_4 & t_6 & & & & \\ & & & & t_1 & t_2 & t_3 & 0 \\ & & & & t_2 & t_a & t_8 & t_5 \\ & 0 & & & t_3 & t_8 & t_b & -t_4 \\ & & & & 0 & -t_5 & t_4 & t_6 \end{pmatrix} \cdot \begin{pmatrix} a_{x10} \\ a_{x11} \\ a_{x12} \\ a_{x13} \\ a_{x20} \\ a_{x21} \\ a_{x22} \\ a_{x23} \end{pmatrix} \quad (23)$$

where $$t_a = \frac{1}{2}(t_1+t_6)+t_7 \quad t_b = \frac{1}{2}(t_1+t_6)-t_7$$

Here $e_1$ and $e_2$ represent the reciprocals $1/|E_1 e r_e|^2$ of the intensities of the ordinary ray component of the ray 1 obtained in the first and second measurement, respectively.

When transforming Equation (23), the following equation is denoted.

$$\begin{pmatrix} e_1 \cdot b_{x10} \\ e_1 \cdot b_{x11} \\ e_1 \cdot b_{x12} \\ e_1 \cdot b_{x13} \\ e_2 \cdot b_{x20} \\ e_2 \cdot b_{x21} \\ e_2 \cdot b_{x22} \\ e_2 \cdot b_{x23} \end{pmatrix} = [M] \cdot \begin{pmatrix} t_1 \\ t_2 \\ t_3 \\ t_4 \\ t_5 \\ t_6 \\ t_7 \\ t_8 \end{pmatrix} \quad (24)$$

where $$[M] = \begin{pmatrix} a_{x10} & a_{x11} & a_{x12} & 0 & 0 & 0 & 0 & 0 \\ \frac{1}{2}a_{x11} & a_{x10} & 0 & 0 & a_{x13} & \frac{1}{2}a_{x11} & a_{x11} & a_{x12} \\ \frac{1}{2}a_{x12} & 0 & a_{x10} & -a_{x13} & 0 & \frac{1}{2}a_{x12} & -a_{x12} & a_{x11} \\ 0 & 0 & 0 & a_{x12} & -a_{x11} & a_{x13} & 0 & 0 \\ a_{x20} & a_{x21} & a_{x22} & 0 & 0 & 0 & 0 & 0 \\ \frac{1}{2}a_{x21} & a_{x20} & 0 & 0 & a_{x23} & \frac{1}{2}a_{x21} & a_{x21} & a_{x22} \\ \frac{1}{2}a_{x22} & 0 & a_{x20} & -a_{x23} & 0 & \frac{1}{2}a_{x22} & -a_{x22} & a_{x21} \\ 0 & 0 & 0 & a_{x22} & -a_{x21} & a_{x23} & 0 & 0 \end{pmatrix}$$

Using the above, we can obtain $t_i$(i=1 through 8) by multiplying both sides of Equation (24) by $[M^{-1}]$ as follows. Here, $M^{-1}{}_{ij}$ represents the (i, j)$^{th}$ element of the matrix $[M^{-1}]$, and $e=e_2/e_1$.

$$t_i = \sum_{\alpha=1}^{4} \{M_{i,\alpha}^{-1} \cdot e_1 \cdot b_{x1\alpha} + M_{i,(\alpha+4)}^{-1} \cdot e_2 \cdot b_{x2\alpha}\} \quad (25)$$

$$= e_1 \cdot \left[ \sum_{\alpha=1}^{4} \{M_{i,\alpha}^{-1} \cdot b_{x1\alpha} + M_{i,(\alpha+4)}^{-1} \cdot e \cdot b_{x2\alpha}\} \right]$$

As Equation (22) shows, tan($2\chi$) is determined as follows.

$$\tan(2\chi) = t_3/t_2 = t_5/t_4 \quad (26)$$

However, in practice, the value of e and the signs of $b_{x13}$ and $b_{x23}$ must be known in order to carry out the computation of Equation (26). In other words, Equation (22) implies that the $t_i$(i=1 through 8) must satisfy the following three equations.

$$t_7^2 + t_8^2 - \frac{1}{4}t_1^2 - \frac{1}{4}t_6^2 + \frac{1}{2}t_1 \cdot t_6 = 0 \quad (27\text{-}2)$$

By substituting Equation (26) into the above, we obtain $$[Q] \begin{pmatrix} e^2 \\ e \\ 1 \end{pmatrix} = \begin{pmatrix} 0 \\ 0 \\ 0 \end{pmatrix}. \quad (28)$$

The elements $Q_{ij}$ of the matrix $[Q]$ are represents as:

$$Q_{11} = \sum_{\beta=1}^{4}\sum_{\alpha=1}^{4}\left[\left\{M_{1,(\alpha+4)}^{-1}\cdot M_{1,(\beta+4)}^{-1} - \left(\sum_{j=2}^{6}M_{j,(\alpha+4)}^{-1}\cdot M_{j,(\beta+4)}^{-1}\right)\right\}b_{x2\alpha}\cdot b_{x2\beta}\right]$$

$$Q_{12} = 2\cdot\sum_{\beta=1}^{4}\sum_{\alpha=1}^{4}\left[\left\{M_{1,\alpha}^{-1}\cdot M_{1,(\beta+4)}^{-1} - \left(\sum_{j=2}^{6}M_{j,\alpha}^{-1}\cdot M_{j,(\beta+4)}^{-1}\right)\right\}b_{x1\alpha}\cdot b_{x2\beta}\right]$$

$$Q_{13} = \sum_{\beta=1}^{4}\sum_{\alpha=1}^{4}\left[\left\{M_{1,\alpha}^{-1}\cdot M_{1,\beta}^{-1} - \left(\sum_{j=2}^{6}M_{j,\alpha}^{-1}\cdot M_{j,\beta}^{-1}\right)\right\}b_{x1\alpha}\cdot b_{x1\beta}\right]$$

$$Q_{21} = \sum_{\alpha=1}^{4}\sum_{\beta=1}^{4}\left[\left\{M_{7,(\alpha+4)}^{-1}M_{7,(\beta+4)}^{-1} + \right.\right.$$
$$M_{8,(\alpha+4)}^{-1}M_{8,(\beta+4)}^{-1} - \frac{1}{4}M_{1,(\alpha+4)}^{-1}M_{1,(\beta+4)}^{-1} - \frac{1}{4}M_{6,(\alpha+4)}^{-1}M_{6,(\beta+4)}^{-1} +$$
$$\left.\left.\frac{1}{2}M_{1,(\alpha+4)}^{-1}M_{6,(\beta+4)}^{-1}\right\}b_{x2\alpha}\cdot b_{x2\beta}\right]$$

$$Q_{22} = \sum_{\alpha=1}^{4}\sum_{\beta=1}^{4}\left[\left\{2M_{7,\alpha}^{-1}M_{7,(\beta+4)}^{-1} + 2M_{8,\alpha}^{-1}M_{8,(\beta+4)}^{-1} - \right.\right.$$
$$\frac{1}{2}M_{1,\alpha}^{-1}M_{1,(\beta+4)}^{-1} - \frac{1}{2}M_{6,\alpha}^{-1}M_{6,(\beta+4)}^{-1} + \frac{1}{2}M_{1,\alpha}^{-1}M_{6,(\beta+4)}^{-1} +$$
$$\left.\left.\frac{1}{2}M_{6,\alpha}^{-1}M_{1,(\beta+4)}^{-1}\right\}b_{x1\alpha}\cdot b_{x2\beta}\right]$$

$$Q_{23} = \sum_{\alpha=1}^{4}\sum_{\beta=1}^{4}\left[\left\{M_{7,\alpha}^{-1}M_{7,\beta}^{-1} + M_{8,\alpha}^{-1}M_{8,\beta}^{-1} - \right.\right.$$
$$\left.\left.\frac{1}{4}M_{1,\alpha}^{-1}M_{1,\beta}^{-1} - \frac{1}{4}M_{6,\alpha}^{-1}M_{6,\beta}^{-1} + \frac{1}{2}M_{1,\alpha}^{-1}M_{6,\beta}^{-1}\right\}b_{x1\alpha}\cdot b_{x2\beta}\right]$$

$$Q_{31} = \sum_{\alpha=1}^{4}\sum_{\beta=1}^{4}[\{M_{2,(\alpha+4)}^{-1}\cdot M_{5,(\beta+4)}^{-1} - M_{3,(\alpha+4)}^{-1}\cdot M_{4,(\beta+4)}^{-1}\}b_{x2\alpha}\cdot b_{x2\beta}]$$

$$Q_{32} = \sum_{\beta=1}^{4}\sum_{\alpha=1}^{4}[\{M_{2,\alpha}^{-1}\cdot M_{5,(\beta+4)}^{-1} - M_{5,\alpha}^{-1}\cdot M_{2,(\beta+4)}^{-1} -$$
$$M_{3,\alpha}^{-1}\cdot M_{4,(\beta+4)}^{-1} - M_{4,\alpha}^{-1}\cdot M_{3,(\beta+4)}^{-1}\}b_{x1\alpha}\cdot b_{x2\beta}]$$

$$Q_{33} = \sum_{\beta=1}^{4}\sum_{\alpha=1}^{4}[\{M_{2,\alpha}^{-1}\cdot M_{5,\beta}^{-1} - M_{3,\alpha}^{-1}\cdot M_{4,\beta}^{-1}\}b_{x1\alpha}\cdot b_{x1\beta}]$$

In order for Equation (28) to have solutions, the determinant of the matrix [Q] must be 0. That is, $$\det(Q) = 0 \quad (29)$$

must hold. Hence, in order to determine proper sign combinations for $b_{x13}$ and $b_{x23}$ out of four choices, i.e, + +, + −, − + and − −, one must first substitute any sign combination, say $+b_{x13}$ and $-b_{x23}$ into Equation (29). If the pair satisfies Equation (29), then one must substitute the pair into Equation (28), and solve Equation (28) for e and $e^2$. Otherwise, one must discard the pair and try another pair. If the values of e and $e^2$ coincide, then the sign combination is chosen. Otherwise, the pair is discarded and another pair is tried. This procedure is repeated until all the four pairs are exhausted. In this way, the signs of $b_{x13}$ and $b_{x23}$ and the value of e can be determined, and one can carry out the computation of Equation (26), and determine the value of $\tan(2\chi)$. Then, by substituting this value into Equation (18) and determining the $b_{oi}$(i=0 through 2), we can determine the values of ▲ and ρ from Equation (5). Once we find the value of the angular displacement χ between the frame of reference of the analyzer and the frame of reference of the Wollaston prism by following the above procedure, we can determine the exact values of ▲ and ρ by substituting the value of χ into Equation (5).

Figure 7:
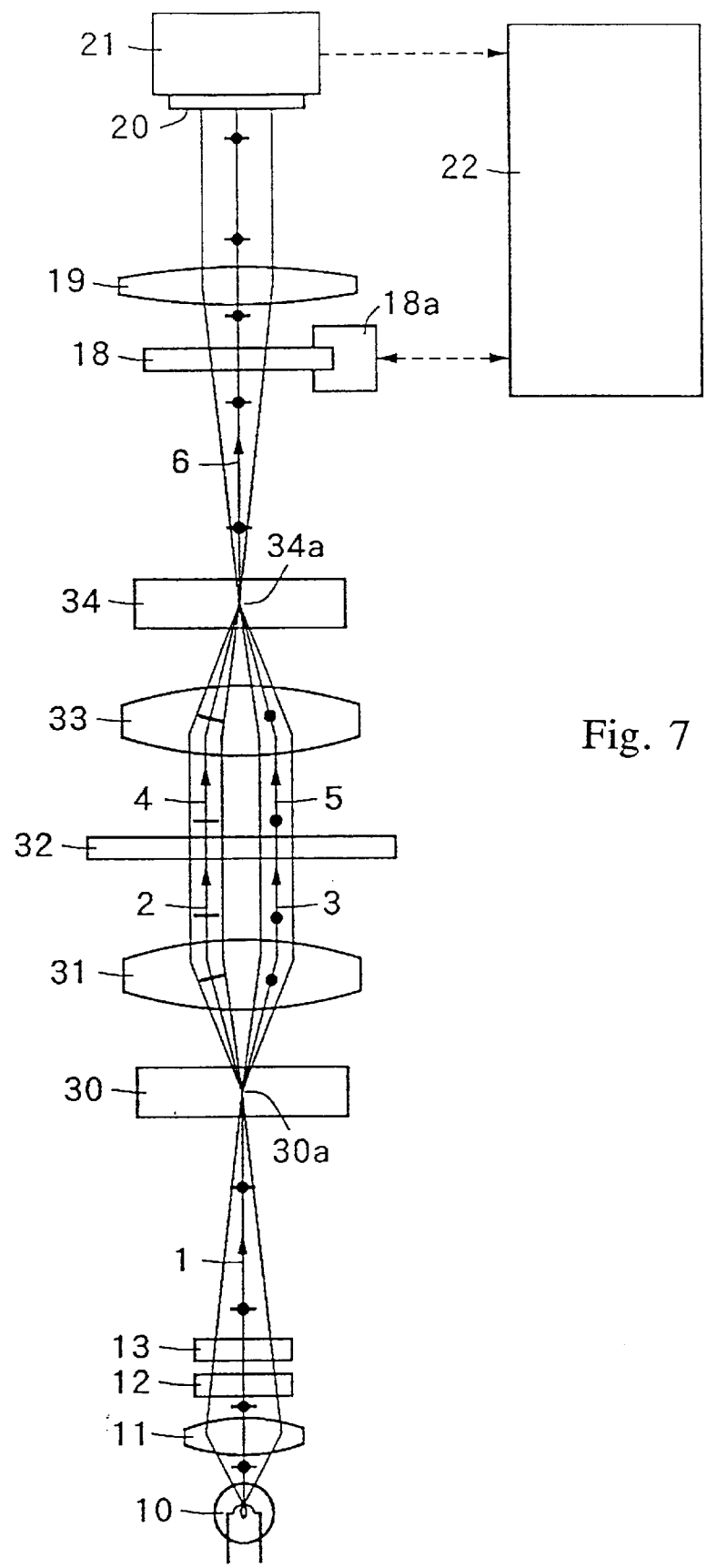
FIG. 7 illustrates the structure of a transmitted-illumination type differential interference microscope according to a second embodiment.
Figure 8:
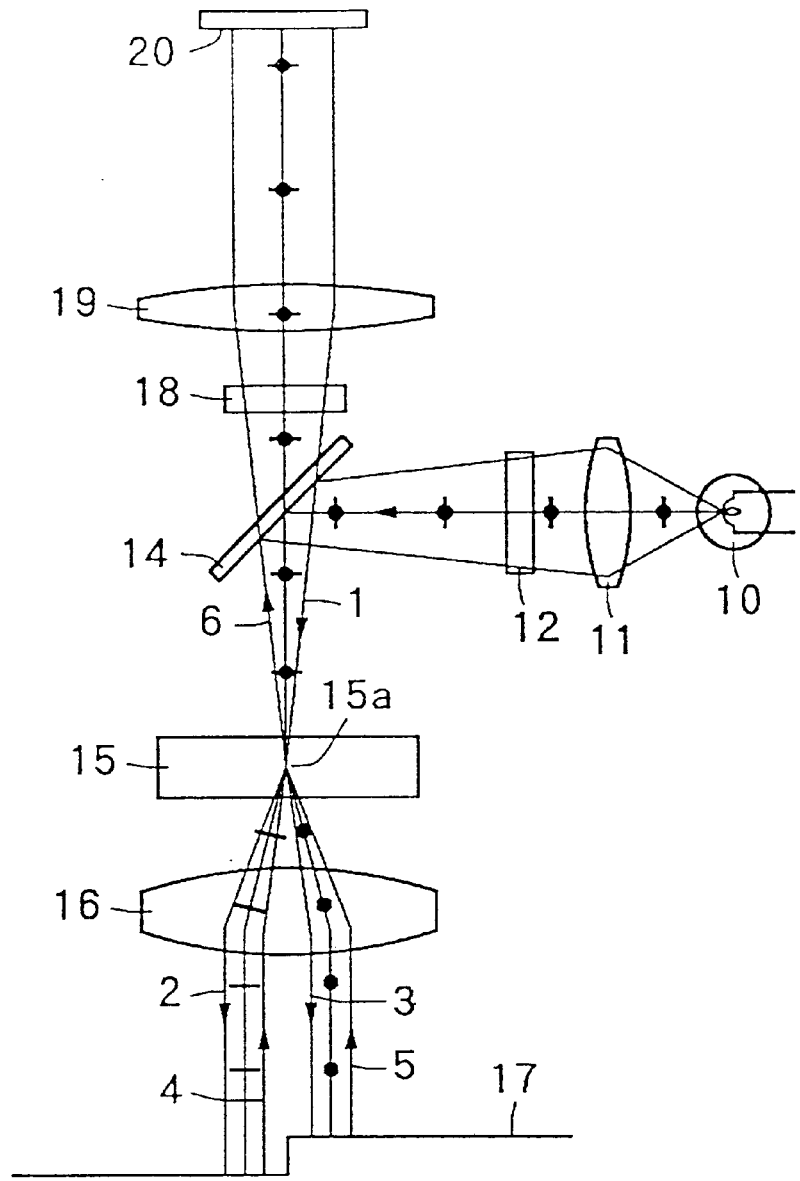
FIG. 8, as noted above, illustrates a conventional differential interference microscope.

FIG. 7 illustrates the second embodiment of the invention. The invention here is applied to a transmissive illumination type differential interference microscope. A ray emitted from a light source 10 passes through a condenser lens 11 and becomes a convergent beam. Then, the convergent beam passes through a polarizer 12 and a phase plate 13 and becomes an elliptically polarized ray 1. The ray 1 enters a first Wollaston prism 30. Then, by the birefringent effect of the Wollaston prism 30, the ray 1 is split into an ordinary ray 2 and an extraordinary ray 3 having electric field oscillation planes which are orthogonal to each other. The two rays propagate into mutually different directions. In FIG. 7, the electric field oscillation plane of the ordinary ray 2 lies parallel to the paper, while the electric field oscillation plane of the extraordinary ray 3 is perpendicular to the paper.

In this case, the ordinary ray 2 and the extraordinary ray 3 spread (diverge) with a certain angle between them. By placing an illumination lens 31, which has the front focal point, at the center 30a of the divergence, the wave fronts of the ordinary ray 2 and the extraordinary ray 3, which have passed through this illumination lens 31, become parallel to each other. Thus, the ordinary ray 2 and the extraordinary ray 3 telecentrically illuminate two points which are slightly separated from each other on a sample 32. The ordinary ray 2 and the extraordinary ray 3 pass through the sample 32 and strike the objective lens 33. The rays that have passed through the sample 32 are indicated as the ordinary ray 4 and the extraordinary ray 5, respectively, in FIG. 7. The ordinary ray 4 and the extraordinary ray 5 pass through the objective lens 33 and enter the second Wollaston prism 34. The back focal point of the objective lens 33 is located at the center 34a of the convergence at which the ordinary ray and the extraordinary ray produced by the second Wollaston prism 34 converge. At the same time, the polarization directions of the ordinary ray and the extraordinary ray produced by the second Wollaston prism 34 are parallel to the polarization directions of the ordinary ray and the extraordinary ray produced by the first Wollaston prism 30, respectively. Consequently, the ordinary ray 4 and the extraordinary ray 5 that have entered the second Wollaston prism 34 merge to become a ray 6 with their wavefronts superimposed on each other. The ray 6 enters a rotary analyzer 18. The analyzer 18 exclusively picks up a component in the direction of the optic axis. The component transmits a focusing lens 19 and forms an image on a CCD 21 installed at the position of the image plane 20.

Depending on the bump distribution and/or the refractive index distribution on the sample 32, the ordinary ray component 4 and the extraordinary ray component 5 of the ray 6 have different optical path lengths since they are transmitted through different points of the sample 32. As a result, interference patterns are formed on the image plane 20. In this case, the contrast of this interference fringe varies as the controller 18a rotates the analyzer 18 around the optical axis. Bumps on the sample 32 are measured by scanning these contrast changes for every pixel of the CCD 21 at a rate synchronized with the rotation of the analyzer 18 and controlled by a computer 22, Fourier-transforming the input and processing the image. Even though the analyzer 18 is rotated in this embodiment, substantially the same result can be obtained by rotating the polarizer 12 and keeping the analyzer 18 fixed.

The measuring principle used in this second embodiment is the same as that in the first embodiment. However, since the differential interference microscope used in this second embodiment is a transmitted-illumination type, ρ represents the absolute value of the ratio between the amplitude transmittance at the incident position of the ordinary ray and that of the extraordinary ray, and ▲ represents the transmittance phase difference between the ordinary ray and the extraordinary ray. Hence, according to this second embodiment, the transmittance distribution of a sample can be measured even when the sample has a distribution in thickness and/or refractive indices. Moreover, distributions in thickness and/or refractive indices of the sample can be measured even when the sample has transmittance distributions.

These embodiments enable accurate measurement of variations in bumps and reflectance on an object surface. Distributions of thickness, refractive indices and/or transmittance of a sample can also be accurately measured. Moreover, the invention enables correct and accurate measurement of the intrinsic polarization direction of a Wollaston prism when this direction is not precisely known. The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

I claim:

1. A differential interference microscope system for observing the surface of an object, the system comprising:
    a light source for creating a light beam for illuminating said object surface;
    optical members in the path of said light beam including a polarizer, a birefringent member, an objective, an analyzer, and a detector; and
    a controller connected to one of the polarizer and the analyzer for rotating one of the polarizer and the analyzer to at least three selected positions; and
    a computer connected to the controller and the detector for managing the controller and for generating an image of the surface being analyzed, wherein
        said light beam is guided to said object via the polarizer, the birefringent member, and the objective, in that order;
        said light beam is reflected from said object and then guided to the detector via the objective, the birefringent member, and the analyzer, in that order;
        at least one of the polarizer and the analyzer is a rotatable element, said element being rotatable about an optical axis along said beam and selectively fixable at at least three known rotation angles by said controller;
        said detector having an array of picture elements on its surface;
        the computer measuring the amount of light incident on each said picture element of the detector at each rotation angle of said rotatable element, and
        the computer further Fourier-transforming said amount of light with respect to each said picture element and each said rotation angle and determining both at least an amplitude reflectance distribution and a surface contour of the surface of the observed object.

2. The differential interference microscope of claim 1, wherein the birefringent member is a birefringent prism which is selectively installed in and removed from said optical path.

3. The differential interference microscope of claim 1, wherein a polarization state of the light beam that illuminates the observed object is switchable.

4. The differential interference microscope of claim 3, further comprising a phase plate set beyond the polarizer along the light beam, and wherein the polarization state of the light beam reflected from the observed object is made switchable by setting the analyzer into any of more than three rotation angles, and wherein the phase plate and the polarizer move together as one unit into several angular positions about the optical axis.

5. The differential interference microscope of claim 3, further comprising a phase plate set beyond the polarizer along the light beam, wherein the polarization state of said light beam reflected from the observed object is made switchable by setting one of the analyzer and the polarizer into any of more than three rotation angles, and wherein the phase plate can be selectively set in and removed from said optical axis.

6. The differential interference microscope of claim 3, wherein the polarization state of the light beam that illuminates the observed object is made switchable by setting one of the analyzer and the polarizer sequentially into more than three rotation angles, placing a phase plate behind the polarizer, and switching the phase plate into several angular positions about the optical axis.

7. The differential interference microscope of claim 3, wherein said detector is a Charge-Coupled Device.

8. The differential interference microscope of claim 2, wherein said polarization state of said light beam as it illuminates the observed object is switchable.

9. The differential interference microscope of claim 8, further comprising a phase plate adjacent the polarizer opposite the light source, wherein the polarization state of the light beam that illuminates the observed object is made switchable by setting the analyzer rotatable into any of more than three said rotation angles and by switching the phase plate and the polarizer together as one unit into several angular positions about the optical axis.

10. The differential interference microscope of claim 8, further comprising a phase plate set adjacent the polarizer and opposite the polarizer from the light source and adapted to be installed in and removed from said optical path, wherein the polarization state of the light beam that illuminates the observed object is made switchable by setting one of the analyzer and the polarizer into more than three said rotation angles and by selectively installing and removing the phase plate from the optical path.

11. The differential interference microscope of claim 8, further comprising a phase plate set adjacent the polarizer and opposite the polarizer from the light source and being selectively rotatable, wherein the polarization state of the light beam that illuminates the observed object is made switchable by setting one of the analyzer and the polarizer into more than three said rotation angles and by switching the phase plate into several angular positions around the optical axis.

12. A differential interference microscope system comprising:
    a light source for creating a light beam directed along a path;
    optical members in the path of said light beam including in order from said light source a polarizer, a first birefringent member, an objective, a second birefringent member, an analyzer, and a detector; and
    a controller for rotating one of the polarizer and the analyzer about said path of the light beam to at least three selected positions about the path; and a computer for managing the controller and for generating an image of a surface to be analyzed, wherein said detector comprises an array of picture elements on its surface; and the computer measures an amount of light on each picture element of the detector and every rotation angle of the rotatable element; and the computer Fourier-transforms a quantity of light with respect to each of said at least three rotation angles in order to determine one of an amplitude transmittance distribution, a thickness distribution, and a refractive index distribution of the observed object.

13. The differential interference microscope of claim 12, wherein the birefringent members are first and second birefringent prisms which are removable from said optical path.

14. The differential interference microscope of claim 12, wherein the polarization state of the light beam that illuminates the observed object is switchable.

15. The differential interference microscope of claim 14, further comprising a phase plate located adjacent the polarizer and opposite the light source, and wherein the phase plate and the polarizer are connected together as one unit for moving into said several angular positions around the optical axis, and wherein the analyzer also is rotatable into three or more angular positions.

16. The differential interference microscope of claim 14, further comprising a phase plate located adjacent the polarizer and opposite the light source, and wherein the phase plate is moveable into and out of said optical path.

17. The differential interference microscope of claim 14, further comprising a phase plate located adjacent the polarizer and opposite the light source, and wherein the phase plate is rotatable into each of several angular positions around the optical axis.

18. A differential interference microscope system able to measure at least two of a surface contour, an amplitude transmittance distribution, a thickness distribution, and a refractive index distribution of an observed object, the system comprising, light supplying means for providing linearly polarized light, the linearly polarized light being selectively polarized in prescribed directions;

optical elements including, in order from the light supplying means, a birefringent member, an objective, and polarized-light selecting means for selecting only light which is linearly polarized in prescribed directions; and a detector having an array of picture elements;

a controller for rotating one of the polarizer and the analyzer to at least three selected positions; and a computer for managing the controller and for generating an image of the surface being analyzed, and wherein linearly polarized rays are provided at at least three rotation angles from at least one of the polarized-light supplying means and the polarized-light selecting means;

the light on each picture element of the detector at each of said at least three rotation angles of one of the polarized-light supplying means and the polarized-light selecting means is measured by the computer; and said computer is set up to Fourier-transform a quantity of light for each said picture element with respect to each of said at least three rotation angles in order to calculate said measure at least two of said surface contour, amplitude transmittance distribution, thickness distribution, and refractive index distribution of the observed object.

19. The differential interference microscope system claimed in claim 18 wherein the birefringent member is a single birefringent prism.

20. The differential interference microscope system claimed in claim 18, wherein the birefringent member includes first and second birefringent prisms.

* * * * *